(12) United States Patent
Yamamoto et al.

(10) Patent No.: US 11,799,840 B2
(45) Date of Patent: Oct. 24, 2023

(54) FAILURE DETECTION DEVICE, FAILURE DETECTION METHOD, AND FAILURE DETECTION PROGRAM

(71) Applicant: Nippon Telegraph and Telephone Corporation, Tokyo (JP)

(72) Inventors: Kodai Yamamoto, Musashino (JP); Koji Tanida, Musashino (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 261 days.

(21) Appl. No.: 16/968,355

(22) PCT Filed: Feb. 27, 2019

(86) PCT No.: PCT/JP2019/007438
§ 371 (c)(1),
(2) Date: Aug. 7, 2020

(87) PCT Pub. No.: WO2019/167984
PCT Pub. Date: Sep. 6, 2019

(65) Prior Publication Data
US 2021/0119984 A1    Apr. 22, 2021

(30) Foreign Application Priority Data

Feb. 28, 2018 (JP) ................................ 2018-034459

(51) Int. Cl.
*H04L 9/40* (2022.01)
*H04L 61/2503* (2022.01)

(52) U.S. Cl.
CPC ........ *H04L 63/065* (2013.01); *H04L 61/2503* (2013.01); *H04L 63/20* (2013.01); *H04L 63/306* (2013.01)

(58) Field of Classification Search
CPC ... H04L 63/065; H04L 61/2503; H04L 63/20; H04L 63/306
See application file for complete search history.

(56) References Cited

U.S. PATENT DOCUMENTS 9,559,985 B1 * 1/2017 Ye ...................... H04L 49/1515
2009/0003329 A1   1/2009 Murakami et al.
(Continued)

FOREIGN PATENT DOCUMENTS

WO   WO 2005/076550    8/2005

OTHER PUBLICATIONS

Vince Lehman; Ashlesh Gawande; Beichuan Zhang; Lixia Zhang; Rodrigo Aldecoa; Dmitri Krioukov; Lan Wang "An experimental investigation of hyperbolic routing with a smart forwarding plane in NDN", IEEE, 10 pages (Year: 2016).*

(Continued)

*Primary Examiner* — Catherine Thiaw
(74) *Attorney, Agent, or Firm* — Fish & Richardson P.C.

(57) ABSTRACT

When a failure occurs in a counterpart company network, the cause of the failure is specified. A failure detection apparatus 1 that detects a failure in a counterpart company network includes a hierarchy level detection unit 11 detecting the number of hierarchy levels indicating a depth of hierarchy levels of the counterpart company network by transmitting a request including the maximum number of transfers to the counterpart company network, a failure location specifying unit 13 specifying a hierarchy level of a failure location in the counterpart company network by transmitting the request to the counterpart company network in a case where the failure in the counterpart company network has been detected, and a determination unit 14 determining that the failure is present in a network core apparatus of the counterpart company network in a case (Continued)

where the hierarchy level of the failure location is a hierarchy level at a depth less than the number of hierarchy levels of the counterpart company network.

20 Claims, 4 Drawing Sheets

(56) References Cited

U.S. PATENT DOCUMENTS

2016/0014020 A1* 1/2016 Kafle ............... H04L 45/28
 370/228
2017/0207990 A1* 7/2017 Curtin ................ H04L 43/12

OTHER PUBLICATIONS

Benoit Donnet, Timur Friedman, and Mark Crovella "Improved Algorithms for Network Topology Discovery", p. 149-162, 6th International Workshop, PAM 2005, Boston, USA (Year: 2005).*
Tuong Le, Steven Cook, Giri Kuthethoor, Prakash Sesha Gregory Hadynski Diane Kiwior David Parker "Performance Analysis for SIP Based VoIP Services over Airborne Tactical Networks", © 2010 IEEE, 8 pages (Year: 2010).*
Müller A, Wohlfart F, Carle G. Analysis and topology-based traversal of cascaded large scale NATs. In Proceedings of the 2013 workshop on Hot topics in middleboxes and network function virtualization Dec. 9, 2013 (pp. 43-48). (Year: 2013).*
Paxson, Vern. "End-to-end routing behavior in the Internet." ACM SIGCOMM Computer Communication Review 26.4 (1996): 25-38 (Year: 1996).*
[No Author Listed], "3GPP TS 29.165 V13.9.0—3rd Generation Partnership Project; Technical Specification Group Core Network and Terminals: Inter-IMS Network Interface (NNI) (Release 13)," 3GPP A Global Initiative, Jun. 2017, 135 pages.
[No Author Listed], "JJ-90.30—Common interconnection interface Between IMS operator's networks," The Telecommunication Technology Committee (TTC), Sep. 11, 2015, 178 pages (with English Translation).
Rosenberg et al., "SIP: Session Initiation Protocol," Network Working Group, Jun. 2002, 270 pages.
Yamamoto et al., "A discussion on how to detect network failures of other companies in GW—Investigation of other network vomerure detection method added NN1-GW," The Institute of Electronics, Information and Communication Engineers of Japan (IEICE)—2017 Conference Discussion Paper Communication 2, Mar. 7, 2017, 3 pages (with English Translation).

* cited by examiner

FAILURE DETECTION DEVICE, FAILURE DETECTION METHOD, AND FAILURE DETECTION PROGRAM

CROSS-REFERENCE TO RELATED APPLICATIONS

This application is a National Stage application under 35 U.S.C. § 371 of International Application No. PCT/JP2019/007438, having an International Filing Date of Feb. 27, 2019, which claims priority to Japanese Application Serial No. 2018-034459, filed on Feb. 28, 2018. The disclosure of the prior application is considered part of the disclosure of this application, and is incorporated in its entirety into this application.

TECHNICAL FIELD

The present disclosure relates to a failure detection apparatus, a failure detection method, and a failure detection program detecting a failure in a counterpart company network.

BACKGROUND ART

In recent years, tests for checking interconnectivity have been performed for IP interconnection between communication operators (carriers), and rules for a SIP signal condition, a point of interface (POI) configuration, or the like have been created (Non Patent Literatures 1 to 3). Now, reviews are expected to be performed for actions at the time of a network failure in an IP interconnection.

CITATION LIST

Non Patent Literature

Non Patent Literature 1: TTC, JJ-90.30, "Common Interconnection Interface Between IMS Operator's Networks"
Non Patent Literature 2: 3GPP, TS 29.165, "Inter-IMS Network to Network Interface (NNI)"
Non Patent Literature 3: IETF, RFC3261, "SIP: Session Initiation Protocol"

SUMMARY OF THE INVENTION

Technical Problem

In a network to network interface-gateway (NNI-GW) installed on a POI boundary between a host company network and a counterpart company network, it is difficult to detect a failure in the counterpart company network. In addition, failure transmission between communication operators is not standardized.

In a case where a host company NNI-GW in the host company network is connected to the counterpart company network at a plurality of POIs, there is a possibility that the failure in the counterpart company network can be quickly avoided by switching the POIs. However, there also is a possibility that a cause of the failure in the counterpart company network is not the counterpart company network itself and is present on a user terminal side.

In a case where the cause of the failure is present on the user terminal side, a scope that the failure affects is limited. In addition, even in a case where the POIs are switched, there is no effect on failure recovery. Meanwhile, in a case where the cause of the failure is the counterpart company network itself, the scope that the failure affects (failure scope) is large, and there is a possibility that the failure can be avoided by switching the POIs. Thus, it is necessary to specify the cause of the failure in the counterpart company network.

Currently, when a failure occurs in the counterpart company network, the host company NNI-GW receives a 500 (server internal error) response from the counterpart company network. However, the cause of the failure cannot be specified from the 500 response.

A method of transferring details of the failure from the counterpart company network is also considered. However, in this case, it is necessary to standardize a combination of "error code+warning code", and every communication operator needs to implement such standardization in the host company network. Thus, such a method is not realistic.

The present disclosure is conceived in view of the above circumstances. An object of the present disclosure is to specify a cause of a failure when the failure occurs in a counterpart company network.

Means for Solving the Problem

In order to accomplish the object, the present disclosure is a failure detection apparatus for detecting a failure in a counterpart company network, the failure detection apparatus including a hierarchy level detection unit configured to detect a number of hierarchy levels indicating a depth of hierarchy levels of the counterpart company network by transmitting a request including the maximum number of transfers to the counterpart company network, a failure location specifying unit configured to specify a hierarchy level of a failure location in the counterpart company network by transmitting the request to the counterpart company network in a case where the failure in the counterpart company network has been detected, and a determination unit configured to determine that the failure is present in a network core apparatus of the counterpart company network in a case where the hierarchy level of the failure location is a hierarchy level at a depth less than the number of hierarchy levels of the counterpart company network.

The present disclosure is a failure detection method of detecting a failure in a counterpart company network by a failure detection apparatus, the failure detection method including detecting a number of hierarchy levels indicating a depth of hierarchy levels of the counterpart company network by transmitting a request including the maximum number of transfers to the counterpart company network, specifying a hierarchy level of a failure location in the counterpart company network by transmitting the request to the counterpart company network in a case where the failure in the counterpart company network has been detected, and determining that the failure is present in a network core apparatus of the counterpart company network in a case where the hierarchy level of the failure location is a hierarchy level at a depth less than the number of hierarchy levels of the counterpart company network.

The present disclosure is a failure detection program that causes a computer to function as the failure detection apparatus.

Effects of the Invention

According to the present disclosure, when a failure occurs in a counterpart company network, a cause of the failure can be specified.

DESCRIPTION OF EMBODIMENTS

Hereinafter, an embodiment of the present disclosure will be described with reference to the drawings.

Figure 1:
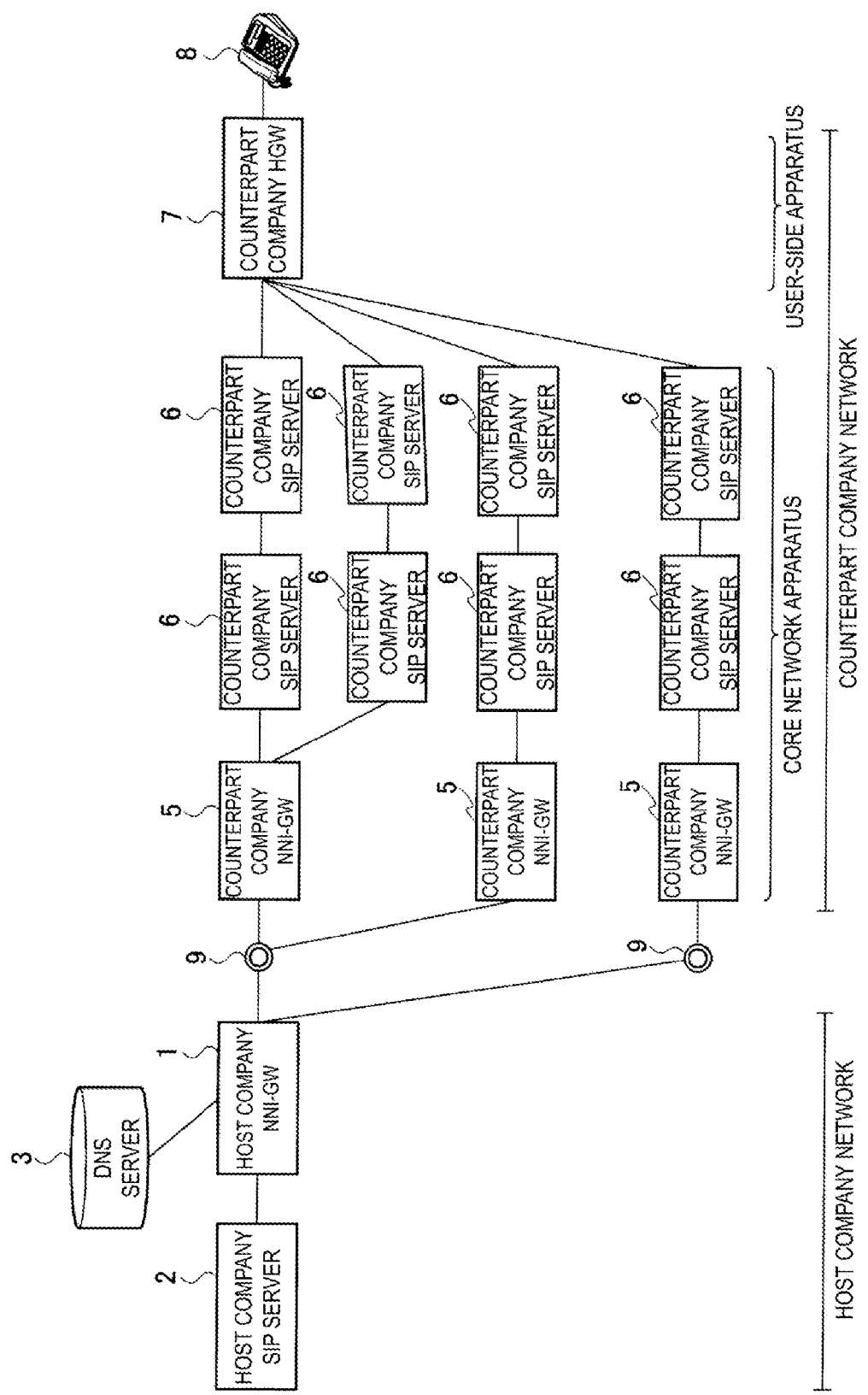
FIG. 1 is a diagram illustrating an overall configuration of a communication system according to an embodiment of the present disclosure.

FIG. 1 is a system configuration diagram illustrating an overall communication system according to the embodiment of the present disclosure. The illustrated communication system is a system in which IP interconnection is made between different communication operators.

In the communication system of the present embodiment, a host company network of a communication operator A that is a host company is connected to a counterpart person network of a communication operator B that is a counterpart company through a plurality of point of interfaces (POIs; interconnection points) 9. The host company network and the counterpart company network are IP networks. In addition, a user terminal 8 is connected to the counterpart person network.

The illustrated host company network includes a host company NNI-GW 1, a host company SIP server 2, and a DNS server 3. The host company NNI-GW 1 is a gateway that is installed on a POI boundary with the counterpart company network. The host company NNI-GW 1 converts a data format, a communication method, or the like in order to connect the host company network and the counterpart company network to each other. In addition, the host company NNI-GW 1 of the present embodiment detects a failure in the counterpart company network. The host company SIP server 2 performs a call process (call control) such as call placement and call reception.

The domain name system (DNS) server 3 performs name resolution for a counterpart company NNI-GW 5 that is arranged in the counterpart company network. Here, the DNS server transmits a list of all counterpart company NNI-GWs 5 arranged in the counterpart company network to the host company NNI-GW 1 in response to a request from the host company NNI-GW 1. In FIG. 1, three counterpart company NNI-GWs 5 are arranged in the counterpart company network. Thus, information related to the three counterpart company NNI-GWs 5 is set in the list.

The illustrated counterpart person network is connected to the host company network (host company NNI-GW 1) through two POIs 9 and includes a plurality of counterpart company NNI-GWs 5, a plurality of counterpart company SIP servers 6A and 6B, and a counterpart company home gateway (HGW) 7. In standardization of the current IP interconnection specifications (adjustment of the communication operators), connection of two networks to each other through the plurality of POIs 9 and connection of a plurality of counterpart company NNI-GWs 5 to one POI 9 have been reviewed. Here, two counterpart company NNI-GWs 5 are connected to a first POI 9, and one counterpart NNI-GW 5 is connected to a second POI 9.

The counterpart company NNI-GW 5 is a gateway that is installed on the POI boundary with the host company network. The counterpart company NNI-GW 5 converts a data format, a communication method, or the like in order to connect two networks to each other. A counterpart company SIP server 6 performs the call process such as call placement and call reception. The counterpart company NNI-GW 5 and the counterpart company SIP server 6 are core network apparatuses of the counterpart company network.

The counterpart company HGW 7 is a user-side apparatus for connecting the user terminal 8 to the counterpart company network. The user terminal 8 is connected to the counterpart company HGW 7. The user terminal 8 is a terminal having a telephone function. For example, a SIP terminal can be used. While one counterpart company HGW 7 and one user terminal 8 are illustrated in FIG. 1, it is assumed that the counterpart company network includes a plurality of counterpart company HGWs 7 and a plurality of user terminals 8 are connected to the counterpart company network.

In one example, the illustrated counterpart company network is, but is not limited to, a network of four hierarchy levels including the counterpart company NNI-GW 5, two counterpart company SIP servers 6, and the counterpart company HGW 7 in order from the left.

In addition, in the communication system illustrated in FIG. 1, while the NNI-GWs 1 and 5 are apparatuses independent of the SIP servers 2 and 6, the SIP servers 2 and 6 may have functions of the NNI-GWs 1 and 5.

Figure 2:
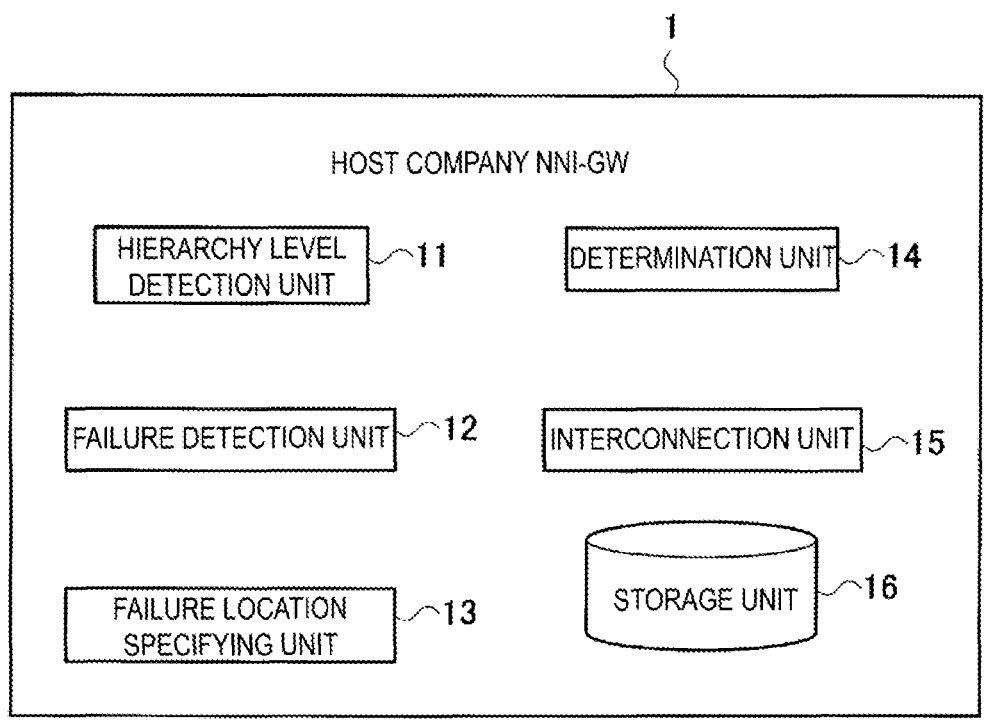
FIG. 2 is a function block diagram illustrating a configuration of a host company NNI-GW.

FIG. 2 is a function block diagram illustrating a configuration of the host company NNI-GW 1 (failure detection apparatus) of the present embodiment. The illustrated host company NNI-GW 1 includes a hierarchy level detection unit 11, a failure detection unit 12, a failure location specifying unit 13, a determination unit 14, an interconnection unit 15, and a storage unit 16.

The hierarchy level detection unit 11 detects the number of hierarchy levels indicating the depth of hierarchy levels of the counterpart company network by transmitting OPTIONS requests that include the maximum number of transfers to the counterpart company network. Specifically, the hierarchy level detection unit 11 transmits each request to the counterpart company network with the maximum number of transfers starting at 0 and increasing by 1 each time thereafter, and specifies a value that is obtained by adding 1 to the maximum number of transfers when a success response is received from the counterpart company network as the number of hierarchy levels indicating the depth of the hierarchy levels of the counterpart company network.

The failure detection unit 12 starts a timer in a case where an INVITE request is transmitted to the counterpart company network. In a case where the failure detection unit 12 does not receive an 18x response (provisional response) with respect to the INVITE request and the timer times out, the failure detection unit 12 detects a failure in the counterpart company network. In addition, in a case where the failure detection unit 12 receives a 500 error response (server internal error) from the counterpart company NNI-GW 5, the failure detection unit 12 detects a failure in the counterpart company network.

In a case where the failure in the counterpart company network has been detected, the failure location specifying unit 13 specifies the hierarchy level of a failure location in the counterpart company network by transmitting the OPTIONS request to the counterpart company network.

In a case where the hierarchy level of the failure location is a hierarchy level at a depth less than the number of hierarchy levels of the counterpart company network, the determination unit 14 determines that the failure is caused by the network core apparatus (the counterpart company NNI-GW 5 or the counterpart company SIP server 6) of the counterpart company network. In a case where the hierarchy level of the failure location is at a depth equal to the number of hierarchy levels of the counterpart company network, the determination unit 14 determines that the failure is caused by the user-side apparatus (counterpart company HGW 7) or the user terminal 8. In addition, in a case where the determination unit 14 determines that the failure is caused by the network core apparatus of the counterpart company network, the determination unit 14 transmits the OPTIONS request to a counterpart company NNI-GW 5 that is different from the currently used counterpart company NNI-GW 5 of the counterpart company network, checks communication of the counterpart company network on a path passing through the different counterpart company NNI-GW 5, and then, switches to the path of the different counterpart company NNI-GW 5.

The interconnection unit 15 converts a data format, a communication method, or the like in order to transmit and receive data to and from the counterpart company network. The storage unit 16 stores the number of hierarchy levels or the like of the counterpart company network detected by the hierarchy level detection unit 11.

For example, a general-purpose computer system that includes a central processing unit (CPU; a processor), a memory, a storage (a hard disk drive (HDD) or a solid state drive (SSD)), a communication apparatus, an input apparatus, and an output apparatus can be used as the host company NNI-GW 1 described above. In this computer system, functions of the host company NNI-GW 1 are implemented by causing the CPU to execute a program for the host company NNI-GW 1 loaded on the memory. The program for the host company NNI-GW 1 can be stored in a computer-readable recording medium such as an HDD, an SSD, a USB memory, a CD-ROM, a DVD-ROM, or an MO, or can be distributed through a network.

Next, an operation in the communication system of the present embodiment will be described.

Figure 3:
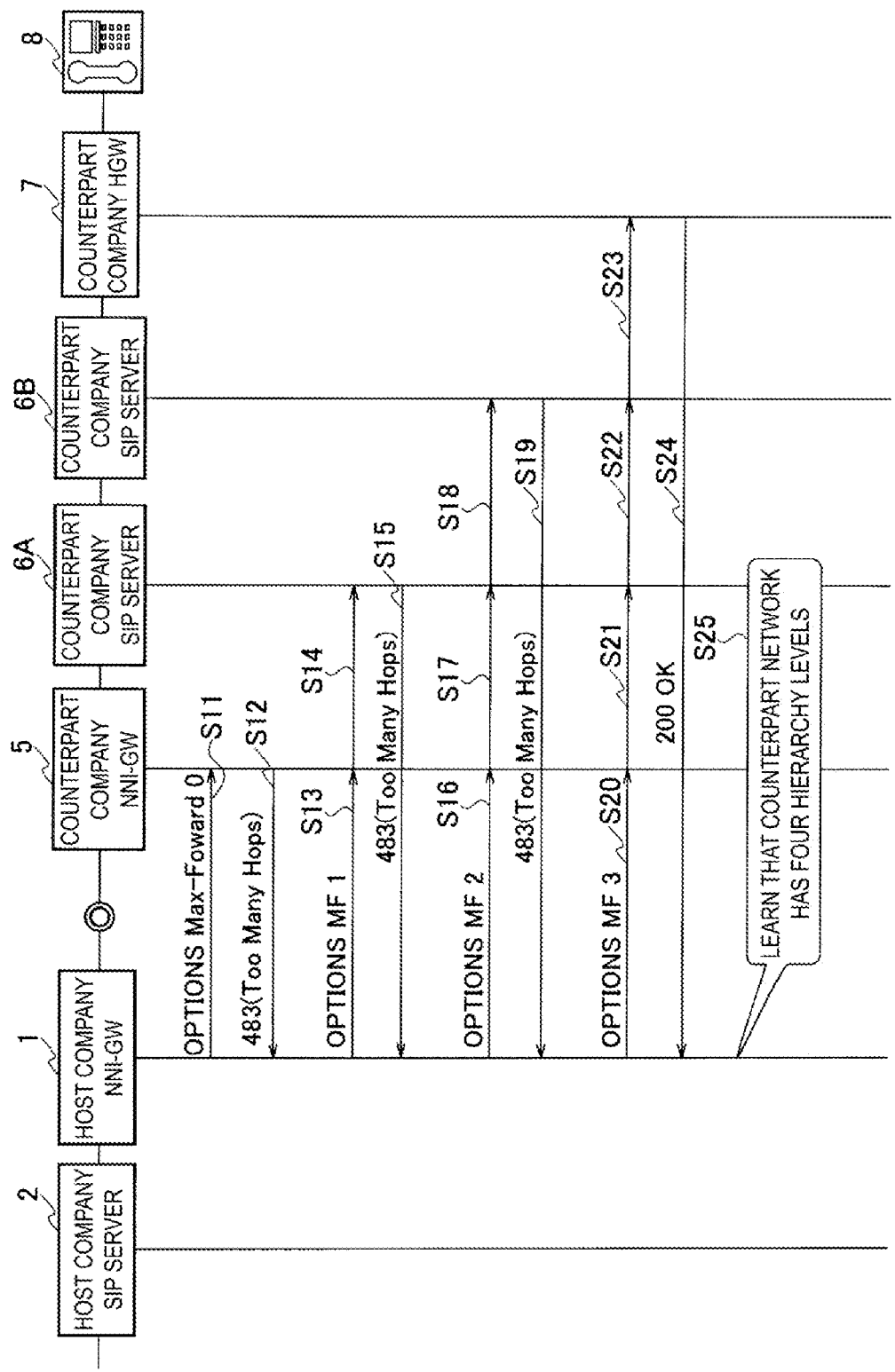
FIG. 3 is a sequence diagram for detecting a number of hierarchy levels of a counterpart company network at normal times.

FIG. 3 is a sequence diagram illustrating operation of the communication system at normal times. The host company NNI-GW 1 normally detects the number of hierarchy levels indicating the depth of the hierarchy levels of the counterpart company network by transmitting an OPTIONS request to the counterpart company network.

Specifically, the hierarchy level detection unit 11 of the host company NNI-GW 1 transmits OPTIONS requests to the counterpart company network in a sampling manner. In such a case, the hierarchy level detection unit 11 transmits OPTIONS requests with a Max-Forward header (hereinafter, referred to as "MF") value indicating the maximum number of transfers of each OPTIONS request that starts at 0 and increases by 1 each time. A destination (Request-URI) of the OPTIONS request is assumed to be any telephone number of a telephone number system of the counterpart company network.

In the illustrated example, the hierarchy level detection unit 11 transmits the OPTIONS request in which 0 is set in the MF value to the counterpart company NNI-GW 5 of the counterpart company network (S11). As illustrated in FIG. 1, in a case where a plurality of counterpart company NNI-GWs 5 are present in the counterpart company network, the hierarchy level detection unit 11 transmits the OPTIONS request to any counterpart company NNI-GW 5 at any POI.

The counterpart company NNI-GW 5 that receives the OPTIONS request tries to decrease the MF value by 1. However, the MF value of the received OPTIONS request is 0. Thus, the counterpart company NNI-GW 5 transmits a 483 error response (error response) to the host company NNI-GW 1 (S12). The 483 error is transmitted in a case where the maximum number of hops is exceeded.

The hierarchy level detection unit 11 transmits the OPTIONS request in which 1 is set in the MF value to the counterpart company NNI-GW 5 of the counterpart company network (S13). The counterpart company NNI-GW 5 decreases the MF value of the OPTIONS request by 1 and transmits the OPTIONS request having the MF value 0 to the counterpart company SIP server 6A which is the subsequent transfer destination (S14). The MF value of the received OPTIONS request is 0. Thus, the counterpart company SIP server 6A transmits the 483 error response to the host company NNI-GW 1 through the counterpart company NNI-GW 5 (S15).

The hierarchy level detection unit 11 transmits the OPTIONS request in which 2 is set in the MF value to the counterpart company NNI-GW 5 of the counterpart company network (S16). The counterpart company NNI-GW 5 decreases the MF value of the OPTIONS request by 1 and transmits the OPTIONS request having the MF value 1 to the counterpart company SIP server 6A which is the subsequent transfer destination (S17). The counterpart company SIP server 6A decreases the MF value of the OPTIONS request by 1 and transmits the OPTIONS request having the MF value 0 to the counterpart company SIP server 6B which is the subsequent transfer destination (S18). The MF value of the received OPTIONS request is 0. Thus, the counterpart company SIP server 6B transmits the 483 error response to the host company NNI-GW 1 through the counterpart company NNI-GW 5 or the like (S19).

The hierarchy level detection unit 11 transmits the OPTIONS request in which 3 is set in the MF value to the counterpart company NNI-GW 5 of the counterpart company network (S20). The counterpart company NNI-GW 5 decreases the MF value of the OPTIONS request by 1 and transmits the OPTIONS request having the MF value 2 to the counterpart company SIP server 6A which is the subsequent transfer destination (S21). The counterpart company SIP server 6A decreases the MF value of the OPTIONS request by 1 and transmits the OPTIONS request having the MF value 1 to the counterpart company SIP server 6B which is the subsequent transfer destination (S22). The counterpart company SIP server 6B decreases the MF value of the OPTIONS request by 1 and transmits the OPTIONS request having the MF value 0 to the counterpart company HGW 7 which is the subsequent transfer destination (S23). The destination of the received OPTIONS request is the counterpart company HGW 7 itself. Thus, the counterpart company HGW 7 transmits a 200 OK response (success response) to the host company NNI-GW 1 through the counterpart company NNI-GW 5 or the like (S24).

The hierarchy level detection unit 11 of the host company NNI-GW 1 detects (learns) that a value obtained by adding 1 to the MF value of the OPTIONS request when the 200 OK response is received is the number of hierarchy levels indicating the depth of the hierarchy levels of the counterpart company network (S25). The hierarchy level detection unit 11 stores the detected number of hierarchy levels in the storage unit 16. In the example illustrated in FIG. 3, in order from the shallowest hierarchy level, the counterpart company NNI-GW 5 is in the first hierarchy level, and the counterpart company SIP server 6A is in the second hierarchy level. The counterpart company SIP server 6B is in the third hierarchy level, and the counterpart company HGW 7 is in the fourth hierarchy level.

In a case where IP interconnection is performed with the counterpart company networks of a plurality of communication operators, the host company NNI-GW 1, for each communication operator, detects the depth of the hierarchy levels of the counterpart company network based on the operation illustrated in FIG. 3 and stores the number of hierarchy levels in the storage unit 16.

In the present embodiment, the depth of the hierarchy levels of the counterpart company network is detected using the OPTIONS request, but the present disclosure is not limited to the present embodiment. A message other than the OPTIONS request may be used as long as the message includes the MF.

Figure 4:
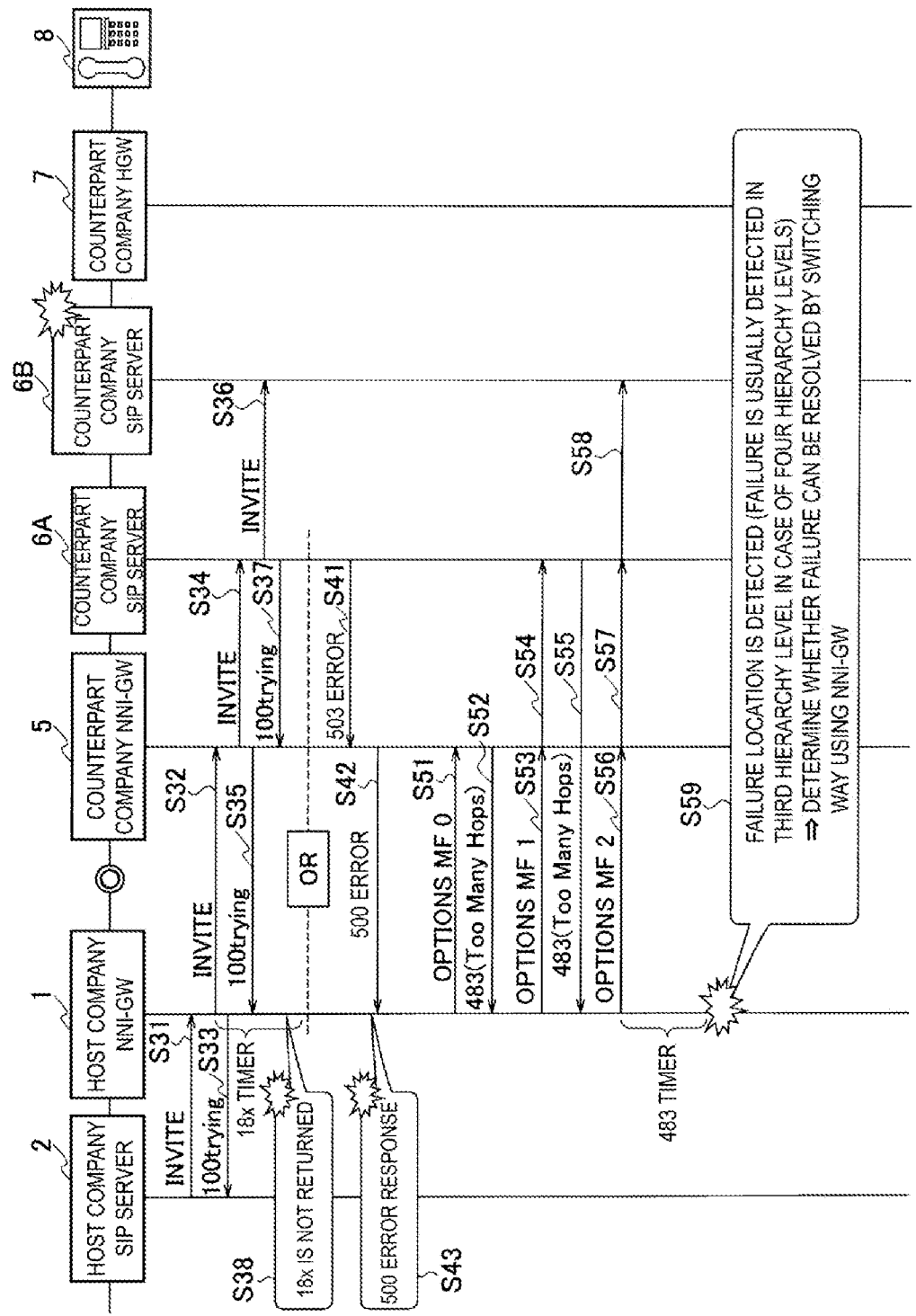
FIG. 4 is a sequence diagram for specifying a failure location in the counterpart company network at the time of a failure.

FIG. 4 is a sequence diagram illustrating an operation of the communication system at the time of a failure. Here, a case where the INVITE request (session establishment request) transmitted by the host company SIP server 2 results in error will be described as an example.

The host company SIP server 2 transmits the INVITE request to the host company NNI-GW 1 (S31). The interconnection unit 15 of the host company NNI-GW 1 transmits the received INVITE request to the counterpart company NNI-GW 5 of the counterpart company network (S32) and transmits a 100 trying response to the host company SIP server 2 (S33).

In addition, at the same time as transmission of the INVITE request to the counterpart company NNI-GW 5 in S32, the malfunction detection unit of the host company NNI-GW 1 starts an 18x reception timer and monitors a timeout. The 18x reception timer is a timer for monitoring reception of the 18x response (for example, 180 Ringing or 181 Call is being forwarded). A timer value of the 18x reception timer is set to a relatively small number in order to quickly detect the failure in the counterpart company network.

The counterpart company NNI-GW 5 transmits the INVITE request to the counterpart company SIP server 6A on the subsequent hierarchy level (S34) and transmits the 100 trying response to the host company NNI-GW 1 (S35). The counterpart company SIP server 6A transmits the INVITE request to the counterpart company SIP server 6B on the subsequent hierarchy level (S36) and transmits the 100 trying response to the counterpart company NNI-GW 5 (S37).

In a case where a failure occurs in the counterpart company SIP server 6B, the counterpart company SIP server 6B cannot receive the INVITE request or cannot process the request even in a case where the INVITE request is received. Thus, the 18x response that is normally transmitted from the counterpart company HGW 7 cannot be received by the host company NNI-GW 1 before the 18x reception timer started in S32 ends. That is, the 18x reception timer started in S34 times out before the 18x response is received. Thus, the failure detection unit 12 detects the occurrence of the failure in the counterpart company network (S38).

Alternatively, in a case where a failure occurs in the counterpart company SIP server 6B, the adjacent counterpart company SIP server 6A detects the failure in the counterpart company SIP server 6B and transmits a 503 error response (Service Unavailable) to the adjacent counterpart company NNI-GW 5 (S41). In a case where the counterpart company NNI-GW 5 receives the 503 error response, the counterpart company NNI-GW 5 interworks the 503 error response into a 500 error response (Server Internal Error), and transmits the 500 error response (Server Internal Error) to the adjacent host company NNI-GW 1 (S42). Thus, the failure detection unit 12 of the host company NNI-GW 1 detects the occurrence of the failure in the counterpart company network (S43).

In the present embodiment, the failure detection unit 12 of the host company NNI-GW 1 detects the failure in the counterpart company network based on the timeout of the 18x reception timer in S38 or by receiving the 500 error response in S43.

In a case where the failure detection unit 12 detects the failure in the counterpart company network, the failure location specifying unit 13 of the host company NNI-GW 1 specifies the failure location in the counterpart company network. Specifically, as described with reference to FIG. 3, the failure location specifying unit 13 performs an SIP traceroute and specifies the failure location by transmitting OPTIONS requests with the MF value indicating the maximum number of transfers included in each OPTIONS request starting at 0 and increasing by 1 each time thereafter. In addition, the failure location specifying unit 13 sets a telephone number designated in the INVITE request (S31, S32, or the like) as the destination (Request-URI) of the OPTIONS request.

Normal apparatuses of the counterpart company network transmit the 483 error response in a case where the MF value becomes 0. Thus, the failure location specifying unit 13 starts a 483 reception timer at the same time as transmitting the OPTIONS request and monitors a timeout of the timer. In a case where the 483 error response cannot be received before the 483 reception timer times out, that is, in a case where the 483 reception timer times out before the 483 error response is received, the failure location specifying unit 13 specifies how many hierarchy levels are present (how many hops are present) from the failure location specifying unit 13 to the malfunction location of the counterpart company network.

In the illustrated example, the failure location specifying unit 13 transmits an OPTIONS request in which 0 is set in the MF value to the counterpart company NNI-GW 5 of the counterpart company network and starts the 483 reception timer (S51). The MF value of the received OPTIONS request is 0. Thus, the counterpart company NNI-GW 5 transmits the 483 error response to the host company NNI-GW 1 (S52).

The hierarchy level detection unit 11 transmits an OPTIONS request in which 1 is set in the MF value to the counterpart company NNI-GW 5 and starts the 483 reception timer (S53). The counterpart company NNI-GW 5 decreases the MF value of the OPTIONS request by 1 and transmits an OPTIONS request having the MF value 0 to the counterpart company SIP server 6A (S54). The MF value of the received OPTIONS request is 0. Thus, the counterpart company SIP server 6A transmits the 483 error response to the host company NNI-GW 1 (S55).

The hierarchy level detection unit 11 transmits an OPTIONS request in which 2 is set in the MF value to the counterpart company NNI-GW 5 of the counterpart company network and starts the 483 reception timer (S56). The counterpart company NNI-GW 5 decreases the MF value of the OPTIONS request by 1 and transmits an OPTIONS request having the MF value 1 to the counterpart company SIP server 6A (S57). The counterpart company SIP server 6A decreases the MF value of the OPTIONS request by 1 and transmits an OPTIONS request having the MF value 0 to the counterpart company SIP server 6B (S58).

Here, a failure occurs in the counterpart company SIP server 6B. Thus, the counterpart company SIP server 6B cannot transmit the 483 error response with respect to the OPTIONS request having the MF value 0. Thus, the failure location specifying unit 13 cannot receive the 483 error response before the 483 reception timer started in S56 times out, and the 483 reception timer times out.

Thus, the failure location specifying unit 13 specifies the malfunction location in the counterpart company network. That is, the failure location specifying unit 13 specifies failure the hierarchy level (hop) corresponding to the value obtained by adding 1 to the MF value of the OPTIONS request when the 483 reception timer times out as the location at which the failure has occurred (S59).

In the example illustrated in FIG. 4, the failure location specifying unit 13 specifies failure the third hierarchy level (counterpart company SIP server 6B) obtained by adding 1 to the MF value 2 of the OPTIONS request when the 483 reception timer times out as the failure location.

The determination unit 14 of the host company NNI-GW 1 determines whether the failure is caused by the network core apparatus of the counterpart company network or the failure is caused by the user-side apparatus or the user terminal 8.

Specifically, in a case where the hierarchy level of the failure location specified by the failure location specifying unit 13 is a hierarchy level (a shallow hierarchy level; a hierarchy level close to the host company NNI-GW 1) at a depth less than the number of hierarchy levels of the counterpart company network detected by the hierarchy level detection unit 11, the determination unit 14 determines that the failure is caused by the network core apparatus (the counterpart company NNI-GW 5 or the counterpart company SIP server 6A or 6B) of the counterpart company network.

Meanwhile, in a case where the depth of the hierarchy level of the specified failure location is equal to the number of hierarchy levels of the counterpart company network, the determination unit 14 determines that the failure is caused by the user-side apparatus (counterpart company HGW 7) or the user terminal 8 (S59). In a case where it is determined that the failure is caused by the user-side apparatus or the user terminal 8, the determination unit 14 determines that the effect of the failure is limited and it is difficult to avoid the failure even by switching to the counterpart company NNI-GW 5 that is different from the currently used counterpart company NNI-GW 5. Thus, the determination unit 14 does not perform a process related to failure avoidance.

A determination method in a case where the determination unit 14 determines that the failure is present in the network core apparatus of the counterpart company network will be described. The determination unit 14 determines that the effect of the failure is significant and there is a possibility of avoiding the failure in a case where the currently used counterpart company NNI-GW 5 is switched to another counterpart company NNI-GW 5. Thus, the determination unit 14 examines reachability of a SIP signal through a counterpart company NNI-GW that is different from the currently used counterpart company NNI-GW 5 which leads to a path of the counterpart company SIP server 6B in which the failure location is specified. That is, depending on a communication check on the path of the different counterpart company NNI-GW 5, a counterpart company NNI-GW 5 (path) which is a switching destination in the counterpart company network is discovered.

Specifically, the determination unit 14 accesses the DNS server 3 and acquires an NNI-GW list in which information (for example, an address such as a URI or identification information) related to all counterpart company NNI-GWs 5 of the counterpart company network is set. The determination unit 14 transmits the OPTIONS request to the counterpart company NNI-GWs other than the currently used counterpart company NNI-GW 5 which is on the path (way) where the failure is detected. At this point, the determination unit 14 transmits OPTIONS requests to the other counterpart company NNI-GWs with the MF value indicating the maximum number of transfers included in each OPTIONS request starting from 0 and increasing by 1 each time, in the same manner as illustrated in FIG. 3. In addition, the determination unit 14 sets the telephone number designated in the INVITE request (S31, S32, or the like) as the destination (Request-URI) of the OPTIONS request. The other counterpart company NNI-GWs 5 include another counterpart company NNI-GW 5 at the same POI and another counterpart company NNI-GW 5 at a different POI as illustrated in FIG. 1.

In a case where the determination unit 14 receives the 200 OK response with respect to the OPTIONS request through a path of any of the other counterpart company NNI-GWs 5, the determination unit 14 determines that the failure can be avoided by switching the counterpart company NNI-GW 5, and performs path switching to the other counterpart company NNI-GW 5. The path switching includes path switching to another counterpart company NNI-GW 5 at the same POI and path switching to another counterpart company NNI-GW 5 at a different POI.

Thus, in the present embodiment, in a case where it is determined that the failure is present in the network core apparatus of the counterpart company network, the path of the switching destination can be discovered, and the failure can be avoided. In addition, in the present embodiment, whether the failure can be avoided by switching the path is verified in advance before the path is switched, by performing a communication check by transmitting the OPTIONS request. Thus, the path is switched only in a case where the failure can be avoided, and an unnecessary process of switching the path in a case where switching the path is not effective (cannot avoid the failure) can be avoided.

In the present embodiment described above, the number of hierarchy levels indicating the depth of the hierarchy levels of the counterpart company network is detected by transmitting a request including the maximum number of transfers to the counterpart company network. In a case where a failure in the counterpart company network has been detected, a hierarchy level of a failure location in the counterpart company network is specified by transmitting the request to the counterpart company network. In a case where the hierarchy level of the failure location is a hierarchy level at a depth less than the number of hierarchy levels of the counterpart company network, it is determined that the failure is present in a network core apparatus of the counterpart company network.

Thus, in the present embodiment, in a case where a failure has occurred in the counterpart company network, whether the scope of the effect of the failure is significant and there is a possibility of avoiding the failure, or the effect of the failure is limited like a failure in the user terminal and there is no possibility of avoiding the failure, can be determined (distinguished).

In addition, in the present disclosure, the 18x reception timer is started in a case where the INVITE request is transmitted to the counterpart company network. In a case where the 18x reception timer times out without reception of the provisional response with respect to the INVITE request, a failure in the counterpart company network is detected in the present disclosure. Thus, in the present embodiment, the failure that has occurred in the counterpart company network can be quickly detected by decreasing the timer value of the 18x reception timer.

In the related art, in order to detect the failure in the counterpart company network, it is necessary to wait for disconnection of a TCP connection to the counterpart company NNI-GW 5 or an INVITE timeout (SIP timer B: 32 seconds). However, in a case where a TCP connection is not made to the counterpart company NNI-GW 5, the failure cannot be detected. In addition, in a case where the failure occurs in an apparatus ahead of the adjacent counterpart company NNI-GW 5, the 100 trying response with respect to the INVITE request is returned from the adjacent counterpart company NNI-GW 5. Thus, the failure cannot be detected. In order to detect the failure in the apparatus ahead of the adjacent counterpart company NNI-GW 5, it is considered that a timeout of an INVITE timer (SIP Timer C: 180 seconds) is used. However, in this case, the amount of time for detecting the failure in the counterpart company network is increased, and a large number of call losses occurs in the meantime.

Meanwhile, in the present embodiment, an increase in the amount of time for detecting the failure in the counterpart company network can be avoided by starting the 18x reception timer in a case where the NVITE request is transmitted to the counterpart company network. The timer value of the 18x reception timer is set as a relatively small amount of time so that the failure can be quickly detected.

In addition, the present embodiment can be implemented by implementing only the host company NNI-GW 1. Thus, the cause of the failure in the counterpart company network can be actively detected without depending on an implementation status of the apparatuses of the counterpart company network. In addition, the implementation is performed inside the host company NNI-GW 1. Thus, development is facilitated. In addition, the failure can be avoided by switching to another counterpart company NNI-GW 5 without involving an operator.

The present disclosure is not limited to the embodiment, and various modifications can be made within the scope of the gist of the present disclosure.

REFERENCE SIGNS LIST

1 Host company NNI-GW
11 Hierarchy level detection unit
12 Failure detection unit
13 Failure location specifying unit
14 Determination unit
15 Interconnection unit
16 Storage unit
2 Host company SIP server
3 DNS server
5 Counterpart company NNI-GW
6 Counterpart company SIP server
7 Counterpart company HGW
8 User terminal

The invention claimed is:

1. A failure detection apparatus operable to detect a failure in a counterpart company network, the failure detection apparatus comprising:
a memory;
a processor coupled to the memory;
a failure detection unit, stored in the memory and executed by the processor, configured to:
start a first timer in a case where a first request is transmitted to the counterpart company network, and
detect the failure in the counterpart company network in a case where the first timer times out without reception of a provisional response with respect to the first request;
a hierarchy level detection unit, stored in the memory and executed by the processor, configured to detect a number of hierarchy levels indicating a depth of hierarchy levels of the counterpart company network based on a response, received from the counterpart company network, to a second request that (i) is transmitted by the hierarchy level detection unit to the counterpart company network and (ii) includes a maximum number of transfers;
a failure location specifying unit, stored in the memory and executed by the processor, configured to:
based on the failure detection unit detecting the failure in the counterpart company network, transmit, to the counterpart company network, a third request and start a second timer when the third request is transmitted, the third request including a maximum number of transfers that starts from 0,
based on a response being received from the counterpart company network in response to the third request, increase the maximum number of transfers by 1 and transmit the third request with the increased maximum number of transfers,
specify a hierarchy level of a failure location in the counterpart company network based on (i) the maximum number of transfers included in the third request and (ii) a response from the counterpart company not being received before the second timer times out in response to the third request; and
a determination unit, stored in the memory and executed by the processor, configured to determine that the failure is present in a network core apparatus of the counterpart company network in a case where the hierarchy level of the failure location is a hierarchy level at a depth less than the number of hierarchy levels of the counterpart company network.

2. The failure detection apparatus according to claim 1, wherein the hierarchy level detection unit is configured to transmit the second request to the counterpart company network with the maximum number of transfers starting from 0 and increasing by 1 each time, and specify a value obtained by adding 1 to the maximum number of transfers based on the response being received from the counterpart company network as the number of hierarchy levels indicating the depth of the hierarchy levels of the counterpart company network.

3. The failure detection apparatus according to claim 1, wherein in a case where the determination unit determines that the failure is present in the network core apparatus of the counterpart company network, the determination unit is configured to:
transmit the third request to a different interface server that differs from a currently used interface server of the counterpart company network,
check communication of the counterpart company network on a path passing through the different interface server, and
switch to the different interface server.

4. The failure detection apparatus according to claim 1, wherein the failure detection unit is configured to, based on the failure detection unit receiving a response regarding an internal server error from the counterpart company network, detect the failure in the counterpart company network.

5. The failure detection apparatus according to claim 1, wherein the determination unit is configured to, in a case where the hierarchy level of the failure location being a hierarchy level at a depth equal to the number of hierarchy levels of the counterpart company network, determine that the failure is caused by a user-side apparatus or a user terminal.

6. The failure detection apparatus according to claim 1, wherein specifying the hierarchy level of a failure location comprises, based on the response from the counterpart company not being received before the second timer times out in response to the third request, determining a value obtained by adding 1 to the maximum number of transfers included in the third request as the hierarchy level of a failure location.

7. The failure detection apparatus according to claim 1, wherein the failure location specifying unit is configured to set a telephone number designated in the first request as a destination of the third request.

8. A failure detection method of detecting a failure in a counterpart company network by a failure detection apparatus, the failure detection method comprising:
   starting a first timer in a case where a first request is transmitted to the counterpart company network;
   detecting the failure in the counterpart company network in a case where the first timer times out without reception of a provisional response with respect to the first request;
   detecting a number of hierarchy levels indicating a depth of hierarchy levels of the counterpart company network based on a response, received from the counterpart company network, to a second request that (i) is transmitted to the counterpart company network and (ii) includes a maximum number of transfers;
   based on the failure being detected in the counterpart company network, transmitting, to the counterpart company network, a third request and starting a second timer when the third request is transmitted, the third request including a maximum number of transfers that starts from 0;
   based on a response being received from the counterpart company network in response to the third request, increasing the maximum number of transfers by 1 and transmitting the third request with the increased maximum number of transfers;
   specifying a hierarchy level of a failure location in the counterpart company network based on (i) the maximum number of transfers included in the third request and (ii) a response from the counterpart company not being received before the second timer times out in response to the third request; and
   determining that the failure is present in a network core apparatus of the counterpart company network in a case where the hierarchy level of the failure location is a hierarchy level at a depth less than the number of hierarchy levels of the counterpart company network.

9. The failure detection method according to claim 8, wherein while detecting the number of hierarchy levels, the second request is transmitted to the counterpart company network with the maximum number of transfers starting from 0 and increasing by 1 each time, and a value obtained by adding 1 to the maximum number of transfers based on the response being received from the counterpart company network is specified as the number of hierarchy levels indicating the depth of the hierarchy levels of the counterpart company network.

10. The failure detection method according to claim 8, further comprising, based on a response regarding an internal server error being received from the counterpart company network, detecting the failure in the counterpart company network.

11. The failure detection method according to claim 8, further comprising, in a case where the hierarchy level of the failure location being a hierarchy level at a depth equal to the number of hierarchy levels of the counterpart company network, determining that the failure is caused by a user-side apparatus or a user terminal.

12. The failure detection method according to claim 8, wherein specifying the hierarchy level of a failure location comprises, based on the response from the counterpart company not being received before the second timer times out in response to the third request, determining a value obtained by adding 1 to the maximum number of transfers included in the third request as the hierarchy level of a failure location.

13. The failure detection method according to claim 8, further comprising setting set a telephone number designated in the first request as a destination of the third request.

14. A non-transitory computer recording medium storing a failure detection program, wherein execution of the failure detection program causes one or more computers to perform operations comprising:
   starting a first timer in a case where a first request is transmitted to a counterpart company network;
   detecting a failure in the counterpart company network in a case where the first timer times out without reception of a provisional response with respect to the first request;
   detecting a number of hierarchy levels indicating a depth of hierarchy levels of the counterpart company network based on a response, received from the counterpart company network, to a second request that (i) is transmitted to the counterpart company network and (ii) includes a maximum number of transfers;
   based on the failure being detected in the counterpart company network, transmitting, to the counterpart company network, a third request and starting a second timer when the third request is transmitted, the third request including a maximum number of transfers that starts from 0;
   based on a response being received from the counterpart company network in response to the third request, increasing the maximum number of transfers by 1 and transmitting the third request with the increased maximum number of transfers;
   specifying a hierarchy level of a failure location in the counterpart company network based on (i) the maximum number of transfers included in the third request and (ii) a response from the counterpart company not being received before the second timer times out in response to the third request; and
   determining that the failure is present in a network core apparatus of the counterpart company network in a case where the hierarchy level of the failure location is a hierarchy level at a depth less than the number of hierarchy levels of the counterpart company network.

15. The non-transitory computer recording medium according to claim 8, wherein detecting a number of hierarchy levels comprises:

specifying a value obtained by adding 1 to the maximum number of transfers based on the response being received from the counterpart company network as the number of hierarchy levels indicating the depth of the hierarchy levels of the counterpart company network.

16. The non-transitory computer recording medium according to claim 14, wherein in a case where it being determined that the failure is present in the network core apparatus of the counterpart company network, (i) transmitting the third request to a different interface server that differs from a currently used interface server of the counterpart company network, (ii) checking communication of the counterpart company network on a path passing through the different interface server, and (iii) switching to the different interface server.

17. The non-transitory computer recording medium according to claim 14, further comprising, based on a response regarding an internal server error being received from the counterpart company network, detecting the failure in the counterpart company network.

18. The non-transitory computer recording medium according to claim 8, further comprising, in a case where the hierarchy level of the failure location being a hierarchy level at a depth equal to the number of hierarchy levels of the counterpart company network, determining that the failure is caused by a user-side apparatus or a user terminal.

19. The non-transitory computer recording medium according to claim 14, wherein specifying the hierarchy level of a failure location comprises, based on the response from the counterpart company not being received before the second timer times out in response to the third request, determining a value obtained by adding 1 to the maximum number of transfers included in the third request as the hierarchy level of a failure location.

20. The non-transitory computer recording medium according to claim 14, wherein the operations further comprise setting a telephone number designated in the first request as a destination of the third request.

\* \* \* \* \*